United States Patent [19]
Donis et al.

[11] Patent Number: 6,014,564
[45] Date of Patent: Jan. 11, 2000

[54] METHOD AND APPARATUS FOR DETERMINING VIRTUAL CELL AREA

[75] Inventors: Gerardo Donis, Dallas; Kalyan Basu, Plano, both of Tex.; David Munoz, Monterrey, Mexico

[73] Assignee: Nortel Networks Corporation, Richardson, Tex.

[21] Appl. No.: 08/892,828

[22] Filed: Jul. 15, 1997

Related U.S. Application Data

[60] Provisional application No. 60/026,934, Sep. 19, 1996.

[51] Int. Cl.⁷ .................................................... H04Q 9/00
[52] U.S. Cl. .......................... 455/436; 455/436; 455/437; 455/438
[58] Field of Search ................... 455/436, 437, 455/438, 439, 440, 441

[56] References Cited

U.S. PATENT DOCUMENTS

| | | | |
|---|---|---|---|
| 5,293,643 | 3/1994 | Israelsson | 455/436 |
| 5,428,816 | 6/1995 | Barnett et al. | 455/436 |
| 5,513,380 | 4/1996 | Ivanov et al. | 455/441 |
| 5,548,806 | 8/1996 | Yamaguchi et al. | 455/441 |

FOREIGN PATENT DOCUMENTS

| | | |
|---|---|---|
| 0 701 382 A1 | 3/1996 | European Pat. Off. . |
| 2 292 288 | 2/1996 | United Kingdom . |
| 2 293 944 | 4/1996 | United Kingdom . |
| 2 294 181 | 4/1996 | United Kingdom . |
| 0 504 122 B1 | 7/1998 | United Kingdom . |
| WO 96/06512 | 2/1996 | WIPO . |
| WO 96/31076 | 10/1996 | WIPO . |
| WO 96/36190 | 11/1996 | WIPO . |

*Primary Examiner*—David R. Hudspeth
*Assistant Examiner*—Daniel Abebe
*Attorney, Agent, or Firm*—John D. Crane

[57] ABSTRACT

The method and apparatus of the architecture of the present invention is accomplished in an embodiment of the present invention by establishing a high speed network interconnection layer between the base station and the mobile switching office. This high speed interconnected network may be an asynchronous transfer mode (ATM) switch. This architecture allows for a dynamic virtual cell area to be configured around a mobile subscriber as a mobile subscriber moves within the network. As a subscriber leaves a previously defined virtual cell area into a new virtual cell area, the high speed switching network sets up a new virtual cell area around the mobile subscriber in his new area. The network is designed to anticipate a user's mobility pattern and to set up the new virtual cell area in advance of the mobile subscriber moving into the that new area. The network is able to predict the mobile subscriber's future location ahead of time, thus enabling the network to accomplish much of the overhead processing and setup used to accommodate the mobile subscriber before arrival in the new area, thus ensuring a smooth handoff and transition period during a call.

19 Claims, 6 Drawing Sheets

○ MICROCELL WHERE THE MOBILE IS    ○ PROBABLE MICROCELL TO BE USED    ○ LESS PROBABLE MICROCELL TO BE USED

METHOD AND APPARATUS FOR DETERMINING VIRTUAL CELL AREA

This application claims benefit of Provisional Appln. 60/026,934 filed Sep. 19, 1996.

BACKGROUND OF THE INVENTION

1. Field of the Invention

The present invention relates generally to wireless communications and specifically to cellular telephone systems.

2. Description of the Related Art

Cellular telephone systems are well known. Mobile subscribers connect via radio transmissions to a base station transceiver, base station transceivers in turn communicate via either land lines or microwave communication lines to base station controllers. Base station controllers in turn communicate through mobile switching centers to a mobile switching office which then connect to the public switched telephone network.

When mobile subscribers travel from one base station coverage area to another base station coverage area, the system must keep track of the mobile subscriber's location. This process becomes critical when a call is in process and it is necessary to handoff the processing of the call between base stations. It is imperative that the call continue smoothly and transparently without being dropped by the network.

Much overhead call processing takes place within the network to insure that calls are not dropped. The current architecture is insufficient to insure that with the continued rise in cellular traffic that calls will be efficiently handled.

There is accordingly a need for a new method and apparatus for handling calls within a cellular network in order to solve or ameliorate the problem of increased traffic in cellular systems.

SUMMARY OF THE INVENTION

The method and apparatus of the architecture of the present invention is accomplished in an embodiment of the present invention by establishing a high speed network interconnection layer between the base station and the mobile switching office. This high speed interconnected network may be an asynchronous transfer mode (ATM) switch.

This architecture allows for a dynamic virtual cell area to be configured around a mobile subscriber as a mobile subscriber moves within the network. As a subscriber leaves a previously defined virtual cell area into a new virtual cell area, the high speed switching network sets up a new virtual cell area around the mobile subscriber in his new area. The network is designed to anticipate a user's mobility pattern and to set up the new virtual cell area in advance of the mobile subscriber moving into the that new area. The network is able to predict the mobile subscriber's future location ahead of time, thus enabling the network to accomplish much of the overhead processing and setup used to accommodate the mobile subscriber before arrival in the new area, thus ensuring a smooth handoff and transition period during a call.

In a preferred embodiment of the present invention, a method and apparatus of call processing in a wireless network includes means for initiating a handoff procedure from a first base station to a second base station, means for redefining a coverage area to include a predetermined number of unit areas within the coverage area based on predetermined characteristics and means for completing the handoff procedure.

The foregoing features together with certain other features described hereinafter enable the overall system to obtain properties differing not by just a matter of degree from any related art, but offering an order of magnitude more efficient use of processing time and resources.

Additional features and advantages of the inventions will be set forth in part in the description which follows, and in part will be apparent from the description, or may be learned by practice of the invention. The advantages of the invention will be realized and attained by means of the elements and combinations particularly pointed out in the appended claims.

It is to be understood that both the forgoing general description and the following detailed description are exemplary in nature only and are not restrictive of the invention as claimed.

The accompanying drawings, which are incorporated in and constitute a part of this specification illustrate preferred embodiments of the apparatus and method according to the invention and, together with the description, serve to explain the principles of the invention.

Further features of the above-described invention will become apparent from the detailed description hereinafter.

DETAILED DESCRIPTION

Figure 1:
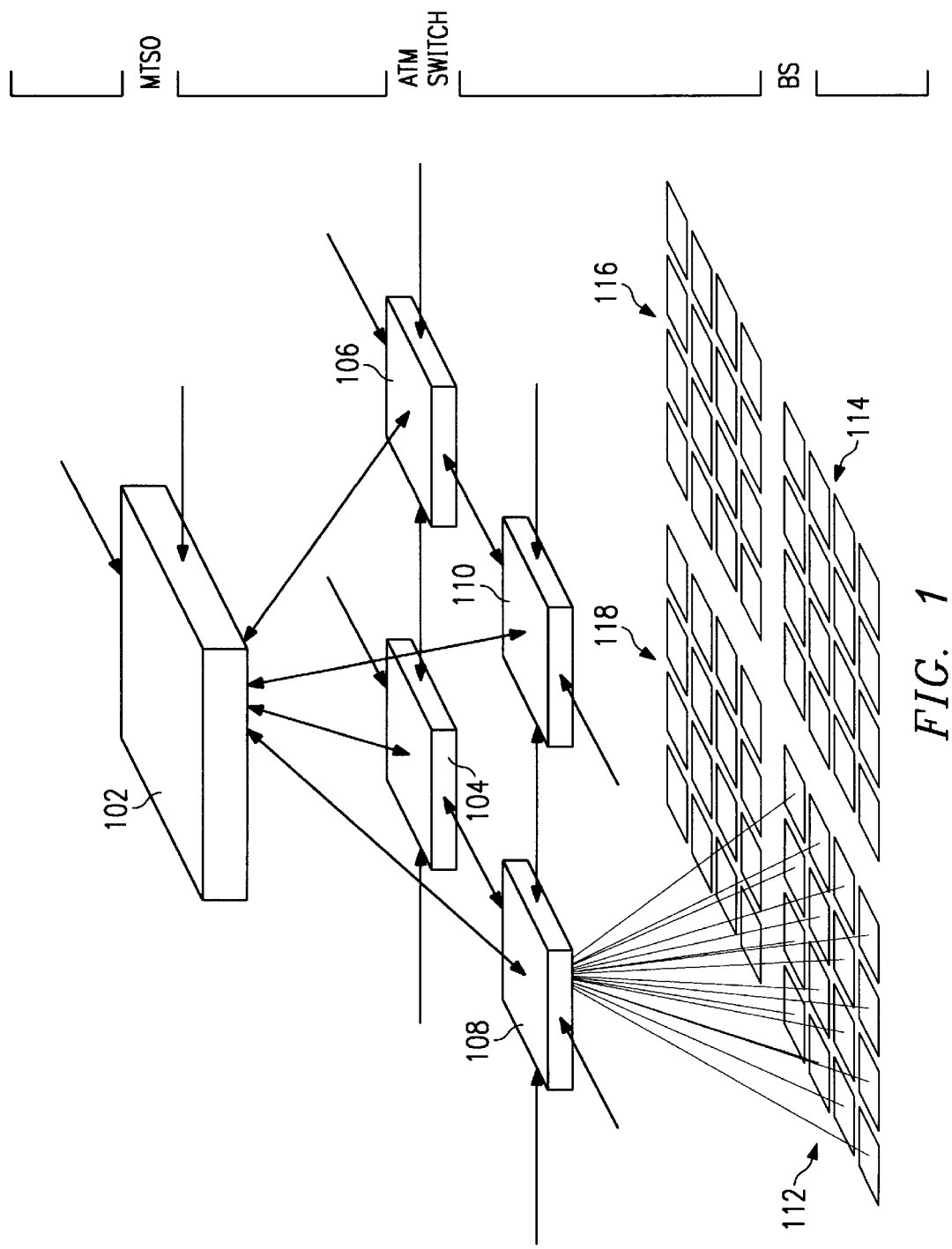
FIG. 1 illustrates a block diagram of the architecture of the present invention.

Referring now to FIG. 1, the architecture of the present invention will now be described.

The first, or lowest layer of the architecture comprises individual base stations 112, 114, 116, 118. They are connected in turn to individual interconnected asynchronous transfer mode (ATM) switches 104, 106, 108, 110. ATM switches 104, 106, 108, and 110 are in turn connected to mobile switching office 102. Mobile switching office (MSO) 102. is then connected to other mobile switching offices through the public switch telephone network (not shown).

Note that ATM switches 104, 106, 108, 110 are interconnected and present a new level of layered architecture not found in conventional cellular systems. In the preferred embodiment of the present invention ATM switches are used. However, any type of high speed interconnected switch/routing capability could be used.

Each ATM switch supports not only the connections of each mobile or group of mobile stations required by each space station, but also the necessary connections to support the creation of virtual cell area. The concept of virtual cell area is the area where a mobile can move between different microcells without having to communicate with the mobile switching office.

Figure 2:
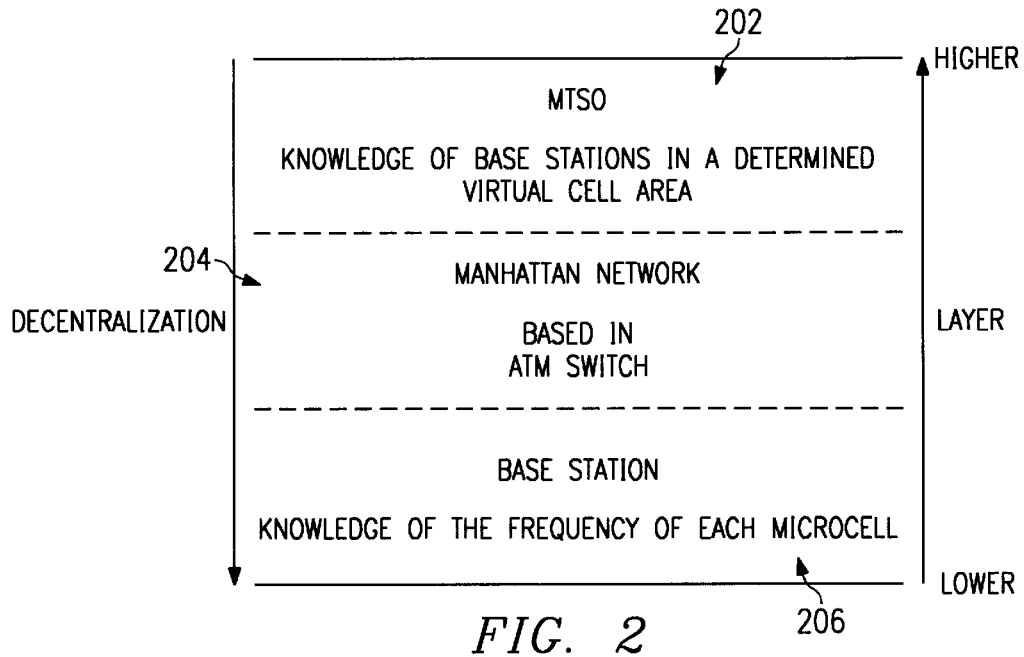
FIG. 2 illustrates a flow diagram of the decentralized processes of the present invention.

FIG. 2 illustrates a flow diagram of the present architecture. The MSO 202 connects through a Manhattan network which is based on an ATM switch design 204. Base stations are again connected to ATM switches 204. The base stations provide a decentralized processing network whereas any call processing conducted by the MSO 202 is in a central area. It is up to the network supplier and service provider as to how to distribute the functions within the network on a decentralized or centralized basis according to the layer.

Figure 3:
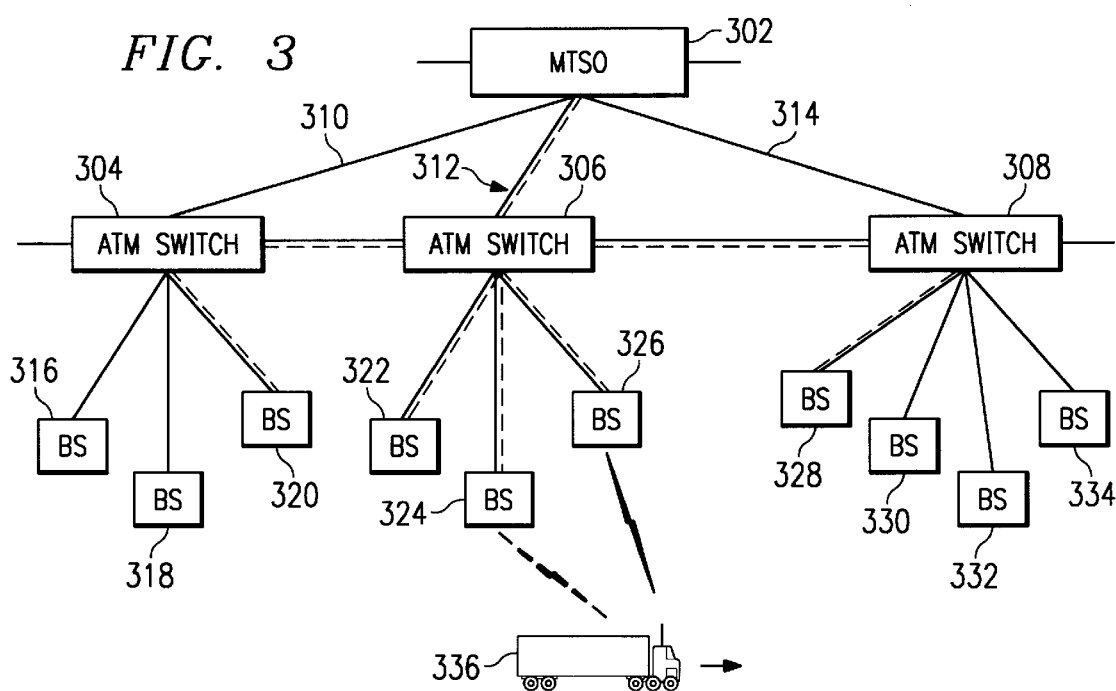
FIG. 3 illustrates the method and apparatus involved in an intervirtual handover.

Referring now to FIG. 3, an intravirtual handover will now be discussed.

MSO 302 has a number of ATM switches connected to it and ATM switches 302, 306, 308 are also interconnected among each other. Each ATM switch 304, 306, 308 has a number of base stations connected to a lower layer of that ATM switch.

When mobile subscriber 336 travels, for example, from base station 324 to base station 326 coverage area, a handoff is required. Since the handoff is between base stations located under the same ATM switch (in this case 306), an intravirtual handover is indicated.

A mobile subscriber is connected to MSO 302 through base station 324 to maintain the communication with another user of the system or another user on another network. The mobile station 336 must continuously monitor the neighboring cells power levels. The base station 324, 326 transmit to the mobile 336 a list of base station channels on which to perform power reception measurements. This list is transmitted on the base channel which is the first channel a mobile turns to when it is turned on. The mobile station performs continuous measurements on the quality and the power level the serving cell and the power levels on the adjacent cells. The measurement results are put into a measurement report which are periodically sent back to the base station 324. The base station 324 itself may also be performing measurements on the quality and power of the link to the mobile station. These measurements indicate the necessity for a handover to an adjacent cell served by base station 326, for example, such a handover is performed seamlessly and transparently to the subscriber as the appropriate base station for a handover is already known. The measurements are received continuously and they reflect the mobile subscribers' point of view. It is up to the operator of the mobile subscriber to act upon different quality or power levels automatically and the handover constraints or thresholds may be adjusted in accordance with changing environment and operating conditions. The management and control of the intravirtual handover is made by the base stations 324, 326.

Figure 4:
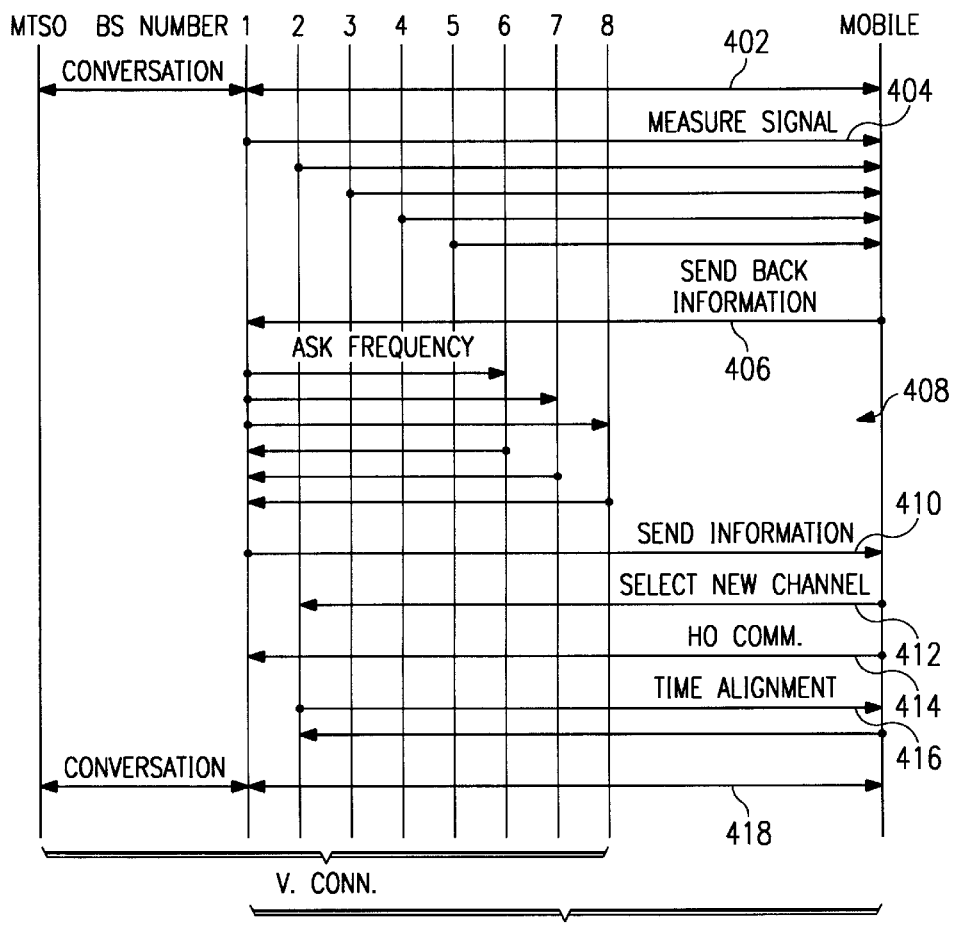
FIG. 4 illustrates a call processing flow diagram for an intravirtual handover.

FIG. 4 will now be discussed. The intravirtual handover process begins at step 402. A conversation occurs between mobile subscriber 336 and base station 324. The mobile subscriber continuously measures the signal power received from the base station 324. When the power level received from the base station is insufficient and a power level from an adjacent base station is sufficient enough, the handover process is started as in step 406. In step 408, the frequency allocation process is requested from the base station and then confirmed by the mobile subscriber. After confirmation, the base station sends information concerning the frequency to be used for transmission and reception to the mobile station 336. The mobile station then selects the new channel and sends that confirmation back to the base station, to the new base station 326. In step 412. In step 414, the handoff is commenced the previous base station 324 no longer communicates with the mobile subscriber and the conversation or data transmission from the mobile subscriber 336 is continued through base station 326. In step 416, a time alignment of the transmitted frequency channel is accomplished. And in step 418, the conversation or data transmission from the subscriber to his or her calling or call party is continued.

The mobile has the capability to analyze the information from the base station and identifies the current frequency that is being used in the base stations. If the frequency desired is already in use in the next base station, then a different frequency is selected. When the overhead is; taken care a handoff is accomplished.

Figure 5:
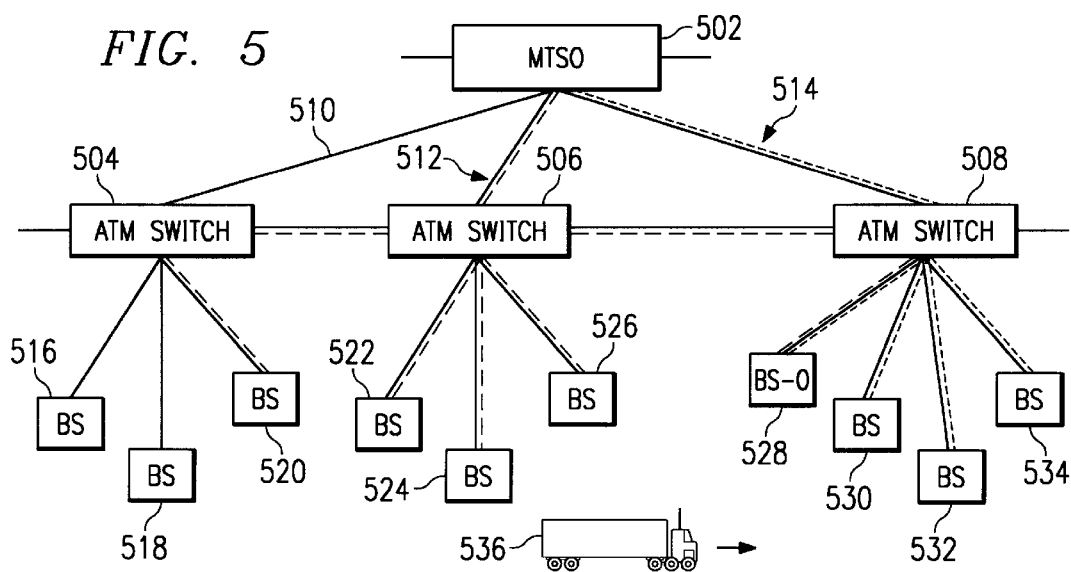
FIG. 5 illustrates method and apparatus for an intervirtual handover.

FIG. 5 will now be discussed as it relates to the intervirtual handover.

In the intravirtual handover, the user mobility allows the production of different types of handover in a cellular system. Once the virtual cell has been created, it can be reduced to process a request to the MSO 502, in an intervirtual handover mobile subscriber 536 travels between for example base station 526 and base station 528. Note that base stations 526 and 528 are located under different ATM switches and call processing handoffs although accomplished in a very similar way to that in FIG. 3 and FIG. 4 must usually involves ATM switches 506 and 508. If base station 528 is outside the previously defined virtual cell area, a call to the MSO 502 must be made and a new virtual cell area must be created. The criteria for designing a new virtual cell area will be discussed subsequently with reference to FIG. 10.

Figure 6:
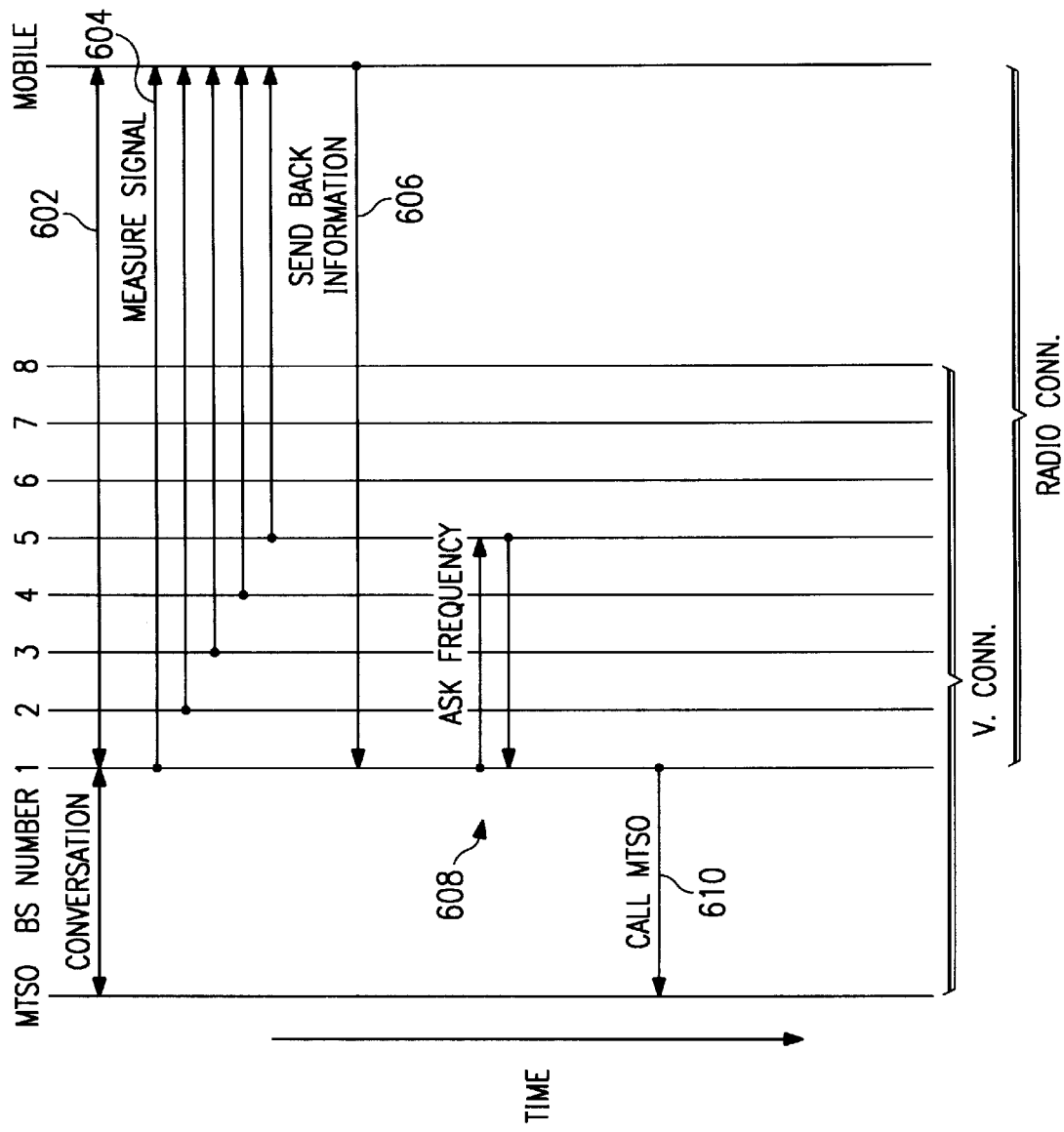
FIG. 6 illustrates a call processing methodology of the intervirtual handover.
Figure 6:
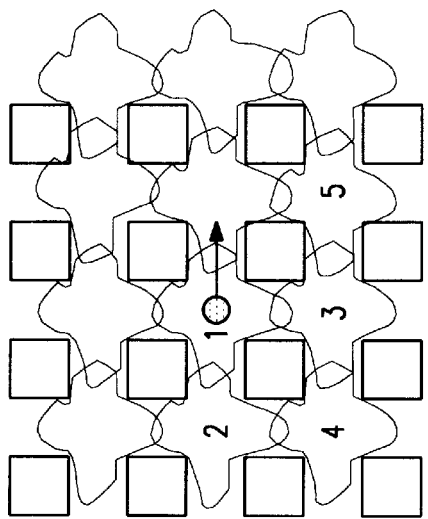

FIG. 6 illustrates an intervirtual handover call methodology. In step 602, a conversation between a mobile through the network occurs. The mobile station continuously measures signal strength from within the current base station cell area and neighboring cell areas. Information is sent back to the base stations from the mobile subscriber and when the signal level becomes sufficiently low within the current cell area, a handoff procedure is initiated and in step 608 the appropriate frequencies in time slots as required if necessary are utilized. Step 610, the base station notifies the MSO, the current status of the call and continues the call and the conversation or call proceeds.

Figure 7:
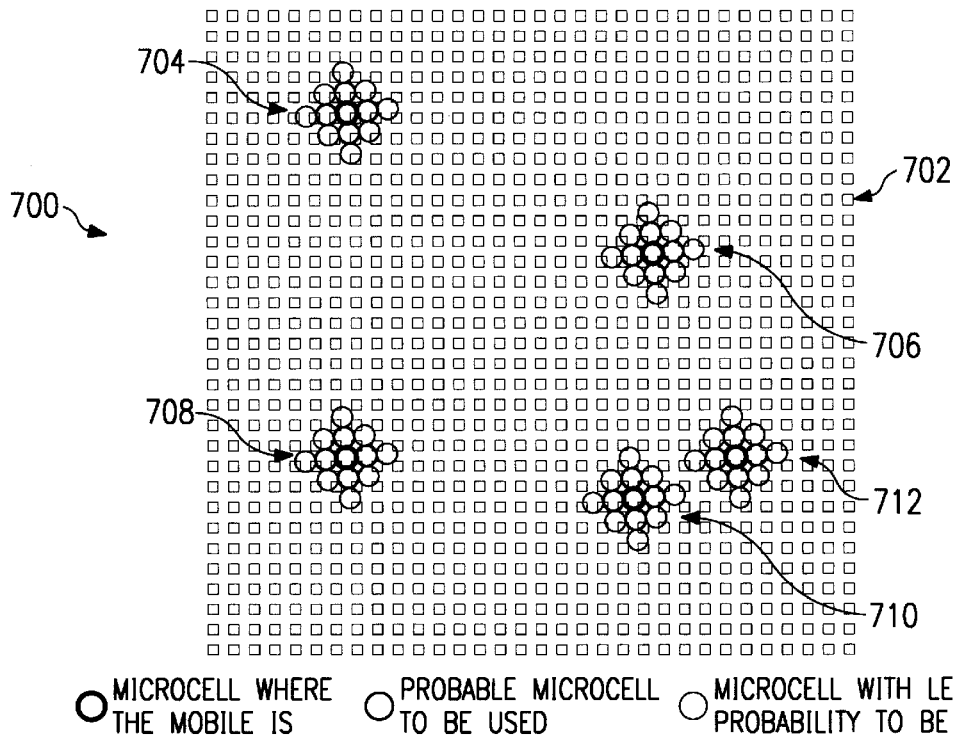
FIG. 7 illustrates a virtual cell area formed with a uniform criteria.

FIG. 7 illustrates a virtual cell area that has been designed with uniform criteria. The center of the virtual cell area indicates the current location of the mobile subscriber. The immediate cells around it indicate a probable or possible microcell that could be used by the mobile subscriber as he travels and the cells located further out indicate that there is less probability that the mobile subscriber will use them. As the mobile subscriber passes through an area and hands-off as the mobile subscriber passes through the outer most layer the MSO redefines the virtual cell area to once again be centered on the mobile subscriber. The use of high speed switches interconnected in an ATM environment allows the creation of the virtual cell area to be transparent to the user and also allows the mobile, the MSO 502 to download the necessary information to a portion of the ATM switch network around which the virtual cell area has been defined. This downloading or delegating responsibility for the network operation to a new mid-level ATM management layer allows for less processing involving the MTSO. The new layer relieves much of the processing burden from the MTSO.

Figure 8:
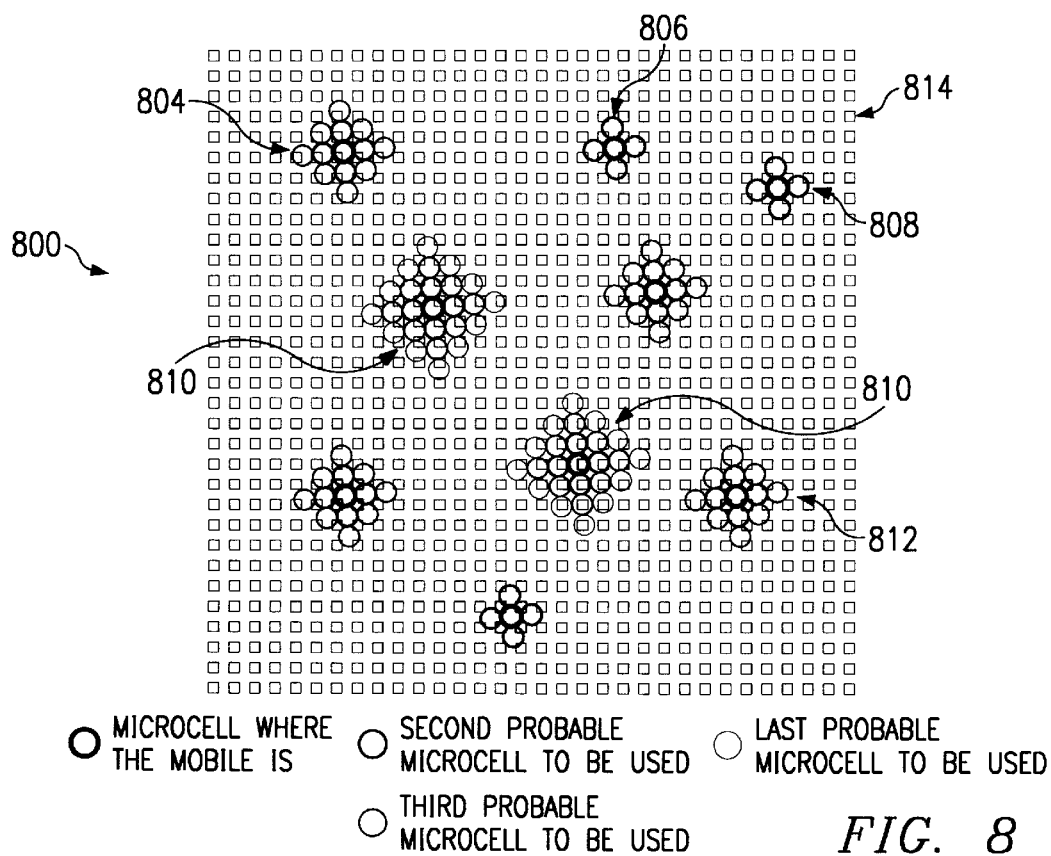
FIG. 8 illustrates a virtual cell area by user criteria.

FIG. 8 illustrates a virtual cell area that is set up based on individual user criteria. User criteria is a established at a predetermined time and is indicative of predefined travel patterns such as where a person lives, works, and routinely travels. This information can be entered into a data base at subscription time or at a later time when events change. This information is specific to a user and generic to a group of users. The data base may also include variables that effect the virtual cell array based on the time of day, the speed limit of the roads located in the area, the rush hour patterns, road construction and activity patterns, and various traffic hazards. The MTSO is aware of how many base stations were selected to create the virtual cell area and thus know the initial position in the area and the pass call holding time of the user. With this information it will identify before making a new request to the MTSO to develop an intervirtual handover.

Figure 9:
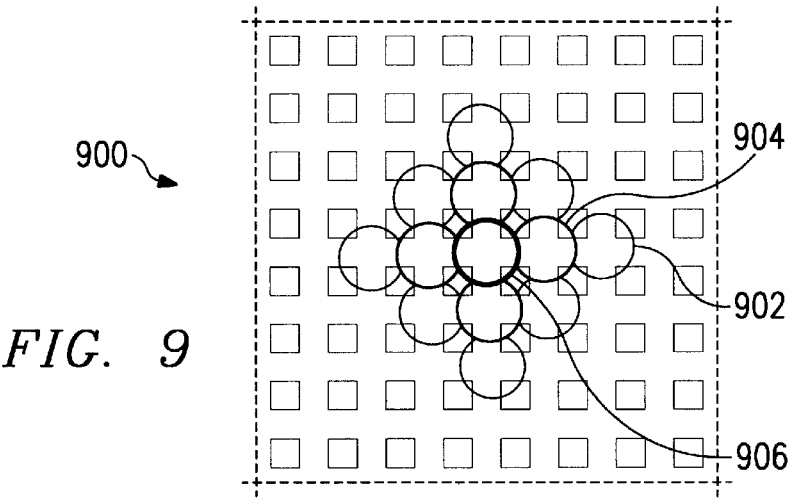
FIG. 9 illustrates a virtual cell area formed with adaptable criteria.

Referring now to FIG. 9, an initial virtual cell area by adaptable criterion is illustrated. The virtual cell area of FIG. 9 is formed in near real time as a user as a mobile subscriber travels around the virtual cell or through the area of coverage. The characteristics used to define the dynamic virtual cell criteria changeable in near real time as previously discussed. The systems are automatic and are programmed into the computer system of the network. Some of the factors included are the past history of the mobile subscriber such as those found in the dynamic static call processing model such as home location, work location, and long term travel history, also taken into consideration is immediate past history destinations, distance, speed, time of day, speed limit and rush hours, road construction and traffic hazards which may be reported and also a near real time basis.

Figure 10:
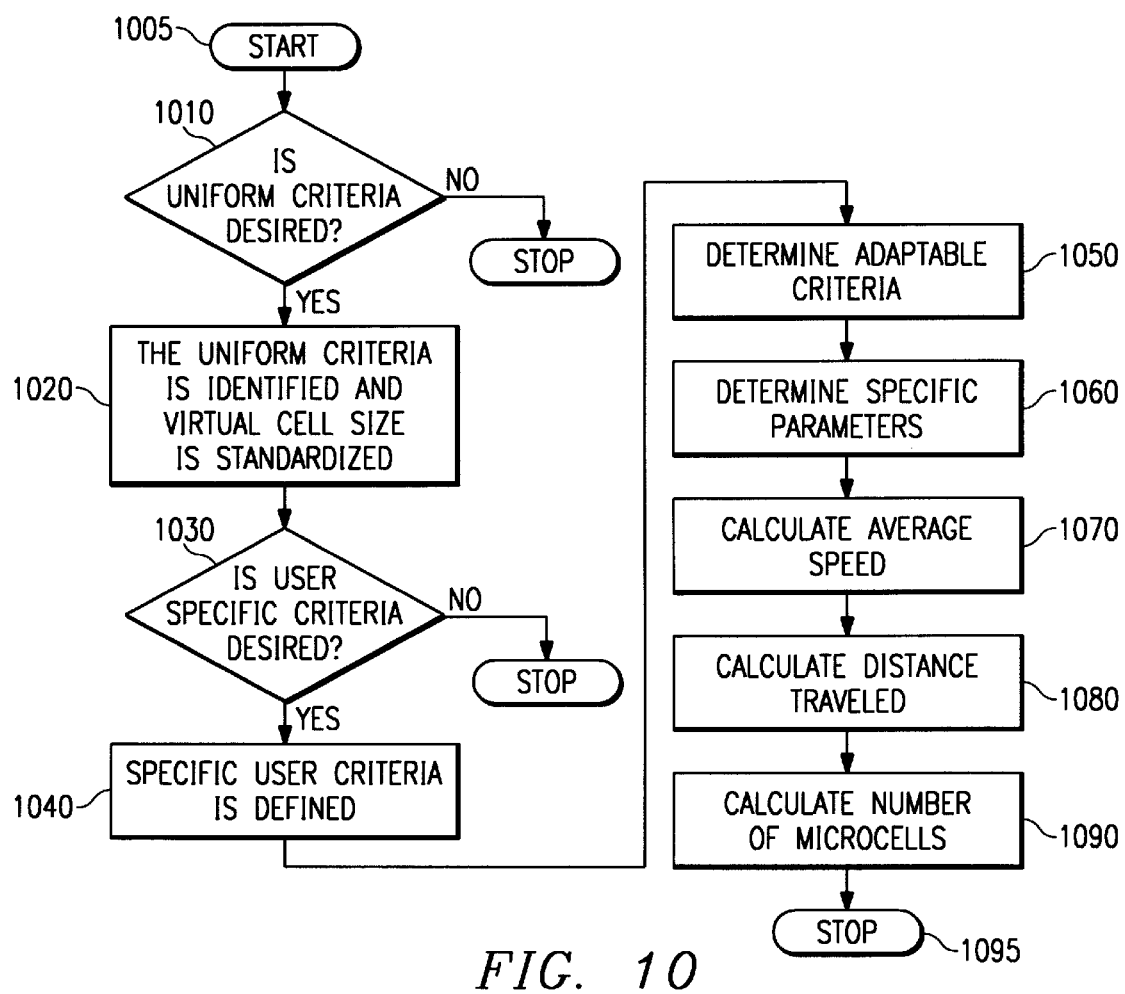
FIG. 10 illustrates a flow chart of methodology of defining a virtual call area.

FIG. 10 illustrates a flow chart of the methodology used to define a virtual call area. In step 1010 it is determined if uniform criteria is desired. In step 1020 the uniform criteria is identified and the standard size for a virtual cell area is applied. The number of microcells within a virtual cell area may be any nonnegative number ranging from, in the preferred embodiment, anywhere from approximately 5 to 25. The exact number is not critical in all embodiments. In step 1030 it is determined if user specific criteria is desired. In step 1040 the specific user criteria is entered into the network and the virtual call area is determined based on such factors as where a person lives, where a person works, past history of holding time, and the initial position within the area of the mobile station. In step 1050 it is determined if adaptable criteria is required for the mobile subscriber if so, in step 1060 the location, holding time, and calculated travel time of the mobile subscriber is determined. The distance traveled and the travel time is counted when the called user answers the call and finished when one or both of the users hangs up the telephone. The average time which is the average holding time of a call within the system is based on historical data is then utilized by the system. The distance between the base station is known and so the approximate distance of the mobile station distance traveled is also known.

The average speed of the mobile station is then obtained according to the equation $S_{average}$=distance traveled divided by time traveled in step 1070. A remainder time $T_{remainder}$ is found with the subtraction of the average time $S_{average}$ minus the travel time in step 1080. The distance D that the mobile may travel in the future is given by the formula $D=S_{average}$ multiplied by $T_{remainder}$. Therefore the number of microcells required is equal to the probable distance that the mobile may travel divided by the distance between base stations as in step 1090. Then the number of microcells in the new virtual cell area is then set up based on the direction of travel, the speed of travel, and other factors as detailed above.

Other such embodiments of the invention will be apparent to those skilled in the art from consideration of the specification and practice of the invention disclosed herein. It is readily apparent that the above described invention may be implemented in any type of wireless communication systems including cellular and PCS. It is intended that the specification and examples be considered as exemplary only with a true scope and spirit of the invention being indicated by the following claims.

What is claimed is:

1. A method of call processing in a wireless network comprising the steps of:

initiating a hand-off procedure from a first base station to a second base station;

defining a coverage area to include a predetermined number of unit areas within said coverage area based on predetermined uniform characteristics wherein said predetermined uniform characteristics are a function of predefined user specific activity; and completing said hand-off procedure.

2. A method of call processing in a wireless network as in claim 1 further comprising:

establishing a coverage area surrounding a predetermined focal point with approximately the same number of unit areas of a previous coverage area upon detection of a mobile unit traversing an edge of a previous coverage area.

3. A method of call processing in a wireless network as in claim 2 wherein said predetermined focal point approximates the center of a circle around a detected location of a mobile unit.

4. A method of call processing in a wireless network as in claim 3 further comprising:

establishing a unit area based on distance.

5. A method of call processing in a wireless network as in claim 4 further comprising:

establishing a call area with a predetermined number of microcells per coverage area.

6. A method of call processing as in claim 1 wherein said predetermined characteristics include a function of the network.

7. A method of call processing as in claim 6 wherein said predetermined characteristics further include a predetermined number of unit areas N dependent upon network topology.

8. A method of call processing as in claim 6 wherein said function of the network further includes a function dependent upon geographic considerations.

9. A method of call processing in a wireless network as in claim 6 further including:

calculating the number of probable microcells to be used in a coverage area by calculating the travel time beginning when a call user answers a call until the call is finished;

calculating the average time which is a predetermined number that is characteristic of the system;

calculating the approximate distance traveled by a mobile subscriber as a function of the distance between base stations;

calculating the average speed of the mobile subscriber travels within the coverage area; calculating a remainder time which is the difference between the average time and the travel time;

calculating distance a new distance D traveled by a mobile subscriber by multiplying the average speed by the remainder time; and calculating the number of microcells in a coverage area as equal to the distance D divided by a predetermined known distance.

10. A method of call processing in a wireless network as in claim 9 wherein said predetermined known distance is the distance between base stations.

11. A method of call processing as in claim 1 wherein said predefined user specific activity includes a predefined travel pattern specific to a user and generic to a group of users.

12. An apparatus for call processing in a wireless network comprising:

means for initiating a hand-off procedure from a first base station to a second base station;

means for defining a coverage area to include a predetermined number of unit areas within said coverage area based on predetermined uniform characteristics wherein said predetermined uniform characteristics are a function of predefined user specific activity; and means for completing said hand-off procedure.

13. An apparatus for call processing in a wireless network as in claim 12 further comprising:

means for establishing a coverage area surrounding a predetermined focal point with approximately the same number of unit areas of a previous coverage area upon detection of a mobile unit traversing an edge of a previous coverage area.

14. An apparatus for call processing in a wireless network as in claim 13 wherein said predetermined focal point approximates the center of a circle around a detected location of a mobile unit.

15. An apparatus for call processing in a wireless network as in claim 14 further comprising means for:

establishing a unit area based on distance.

16. An apparatus for call processing in a wireless network as in claim 15 further comprising means for:

establishing a call area with a predetermined number of microcells per coverage area.

17. An apparatus for call processing as in claim 12 wherein said predetermined characteristics include a function of the network.

18. An apparatus for call processing as in claim 12 wherein said predetermined characteristics further include a predetermined number of unit areas N dependent upon network topology.

19. An apparatus for call processing in a wireless network as in claim 13 further including means for calculating the number of probable microcells to be used in a coverage area by calculating the travel time beginning when a call user answers a call until the call is finished; calculating the average time which is a predetermined number that is characteristic of the system; calculating the approximate distance traveled by a mobile subscriber as a function of the distance between base stations; calculating the average speed of the mobile subscriber travels within the coverage area; calculating a remainder time which is the difference between the average time and the travel time; calculating distance a distance D traveled by a mobile subscriber by multiplying the average speed by the remainder time; and calculating the number of microcells in a coverage area as equal to the distance D divided by a predetermined known distance.

* * * * *